June 2, 1936.　　　J. C. PATTERSON　　　2,042,481
DEVICE FOR PAYING OUT A HOISTING LINE
Filed May 27, 1935
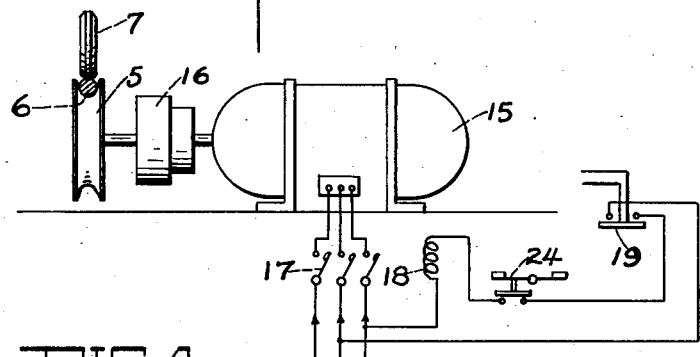
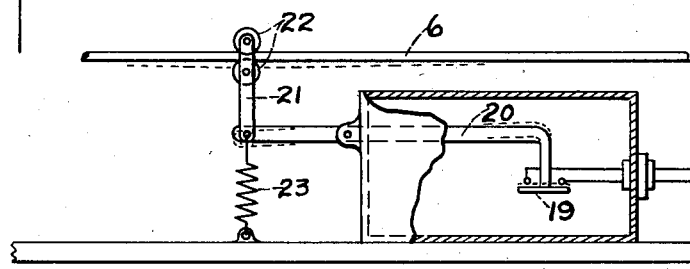
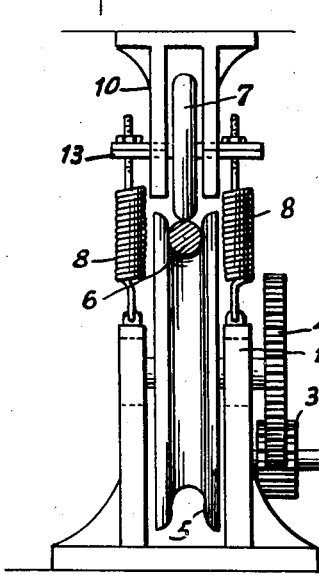
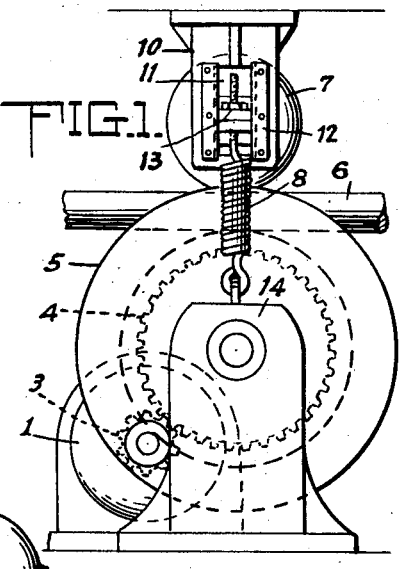
INVENTOR
JOSEPH C. PATTERSON
BY
ATTORNEY Patented June 2, 1936

2,042,481

UNITED STATES PATENT OFFICE 2,042,481

DEVICE FOR PAYING OUT A HOISTING LINE

Joseph C. Patterson, Washington, D. C.

Application May 27, 1935, Serial No. 23,693

14 Claims. (Cl. 254—172)

(Granted under the act of March 3, 1883, as amended April 30, 1928; 370 O. G. 757)

This invention relates to mechanism for paying out the cable on a crane or other similar hoisting mechanism. It is the object of this invention to provide means for unwinding the cable from the drum on which it is wound when hoisting and so to construct such device that the cable may be wound in while the prime mover of the device remains energized without reversing the direction of operation of such prime mover.

In the drawing:

Fig. 1 is an end elevation of one embodiment of the present invention utilizing a torque motor;

Fig. 2 is a side elevation of the mechanism shown in Fig. 1;

Fig. 3 is a side elevation of a different application of the present invention using an electric motor of the ordinary type with a fluid clutch connecting the motor to the cable pulley and a schematic diagram of a slack cable switch circuit for supplying the power to the motor;

Fig. 4 is a detail view of the slack cable switch.

The present invention is intended to unwind a hoisting cable from the hoisting drum and pay out the cable to be connected to an object to be hoisted, for example, an aircraft that is to be lifted from the water to the deck of a ship.

The motor 1 is of the torque type of alternating current motor which may be stalled or have the direction of rotation of its armature reversed without injury to the motor. It is connected through gears 3 and 4 to the grooved pulley 5 over which the cable or hoisting line 6 passes.

Adjacent to pulley 5 is mounted a suitable bracket or hanger 10 having two arms in each of which is an elongated slot 11 and on each of which are guides 12 to retain the bearing mounting 13 operatively associated with the arms while permitting the mounting to move freely longitudinally in the slot. Each of the springs 8 is connected at one end to a support 14 for the pulley 5 and to the bearing mounting 13 and is placed under such tension that the cable 6 is held in firm frictional engagement with the pulley 5 by the wheel 7 mounted in bearings 13 and with its periphery in contact with the cable 6.

When the cable is to be paid the motor 1 is started and, due to the frictional engagement of cable 6 with the pulley 5, a sufficient pull is exerted upon the cable to pay it out. However, if the drum upon which the cable 6 is wound is locked against rotation while the motor 1 is energized the motor will stall but will be ready without further attention to pay out the cable as soon as the drum is released. When the cable 6 is wound in by the hoisting mechanism the friction of cable 6 on pulley 5 will overhaul motor 1 and cause the armature thereof to rotate in a direction opposite to its normal direction while running.

In Fig. 3 the motor 15 is of any desired type and is connected to the pulley 5 through a clutch 16 of the fluid type which will exert a driving torque upon the pulley 5 up to any magnitude for which the clutch is designed but when the torque exceeds such magnitude the clutch slips. This permits the motor 15 to continue in operation in its normal direction of rotation when the cable is held stationary or when it is being wound in.

Instead of relying upon the clutch 16 to prevent injury to the motor 15 when the pulley 5 is held stationary or while the cable is being wound in, the motor may be de-energized by the use of a slack cable switch. The switch 17 controls the supply of current to the motor 15 and is moved to the circuit closing position by a solenoid 18 when the solenoid is energized. Slack cable switch 19 is connected to break the circuit to switch closing solenoid 18 when the cable between pulley 5 and the end of the cable attached to the load is held taut, which will occur when the line is being used either to hoist a load, lower a load or merely support a load. As shown in Fig. 4, the switch 19 may be connected to one end of a lever 20 that is pivotally mounted intermediate its ends and has connected to its other end a link 21 that carries two pulleys 22 which ride upon opposite sides of the cable 6. A spring 23 also is connected to lever 20 and tends to move the switch 19 to the circuit closing position when cable 6 is slack, but when the cable is taut the pull of spring 25 is overcome and switch 19 is moved to the circuit breaking position. A switch 24 is provided to open and close the circuit of solenoid 18 to put the other parts to the circuit positively either in the operative or inoperative position.

It will be understood from the foregoing that by the operation of the slack cable switch mechanism the motor 15 will be de-energized whenever the cable is supporting a load, whether the load is in motion or is stationary and hence will conserve power. However, if the switch 24 is closed and the cable 6 is held against being paid out but carries no load the clutch 16 will function and permit the motor to continue in operation and it will, therefore, begin immediately to pay out the line as soon as the line is free to move.

The invention described herein may be manufactured and used by or for the Government of the United States for governmental purposes without the payment of any royalty thereon or therefor.

I claim:

1. In combination, a rotatably mounted grooved pulley, a bracket mounted adjacent thereto, bearings mounted in said bracket for sliding movement toward and away from said pulley, a wheel rotatably mounted in said bearings to be movable into contact with a cable in the groove in said pulley, a contractile spring connected to each of said bearings to pull said wheel strongly toward said pulley, and means including a prime mover to drive said pulley in one direction, said means being adapted to permit said pulley to be driven in a direction opposite to said one direction while the said prime mover continues energized in the same direction.

2. In combination, a pulley, means to press a flexible line into firm frictional engagement with said pulley, and means operative to drive said pulley to pay out said line in one direction but which is ineffective to prevent reverse rotation of said pulley by winding in of said line in the opposite direction, said last named means including a prime mover.

3. In combination, a pulley, means to press a flexible line into firm frictional engagement with said pulley, and means continuously effective to exert effort to pay out line immediately upon said line being free to be paid out but ineffective while said line is being wound in or is held taut by load, said last named means including a prime mover connected to drive said pulley individually.

4. In combination, a rotatably mounted grooved pulley, a bracket mounted adjacent thereto, bearings mounted in said bracket for sliding movement toward and away from said pulley, a wheel rotatably mounted in said bearings to be movable into contact with a cable in the groove in said pulley, a contractile spring connected to each of said bearings to pull said wheel strongly toward said pulley, and a torque type motor connected to drive said pulley.

5. In combination, a rotatably mounted grooved pulley, a bracket mounted adjacent thereto, bearings mounted in said bracket for sliding movement toward and away from said pulley, a wheel rotatably mounted in said bearings to be movable into contact with a cable in the groove in said pulley, means to press a cable into firm frictional contact with the groove in said pulley, and a torque type motor connected to drive said pulley.

6. In combination, a rotatably mounted pulley, means to press a flexible line into firm frictional contact with said pulley, and a torque type motor connected to drive said pulley.

7. In combination, a rotatably mounted pulley, means to press a flexible line into firm frictional contact therewith, an electric motor, and means forming a driving connection between said pulley and said motor whereby said motor drives said pulley in one direction when the torque necessary to rotate the pulley in the said direction is of less than a predetermined magnitude but is ineffective to drive said pulley when said torque is greater than the said magnitude.

8. In combination, a rotatably mounted pulley, means to press a flexible line into firm frictional contact therewith, an electric motor, means forming a driving connection between said pulley and said motor whereby said motor drives said pulley in one direction when the torque necessary to rotate the pulley in the said direction is of less than a predetermined magnitude but is ineffective to drive said pulley when said torque is greater than the said magnitude, and means operable by said line to break the supply circuit to said motor when said line is taut on that side of said pulley to which the line is moved when the pulley is driven by the prime mover.

9. In combination, a rotatably mounted pulley, means to press a flexible line into firm frictional contact therewith, an electric motor operatively connected to drive said pulley, and means operable by said line to break the supply circuit when said line is taut on that side of said pulley to which the line is moved when the pulley is driven by the electric motor.

10. In combination, a rotatably mounted pulley, means to press a flexible line into firm frictional contact therewith, a prime mover operatively connected to drive said pulley, and means operable by said line to interrupt the supply of energy to said prime mover while said line is taut on that side of said pulley to which the line is moved when the pulley is driven by the prime mover.

11. In combination, a rotatably mounted pulley, means to press a flexible line into firm frictional contact therewith, and driving means operatively connected to said pulley to exert a predetermined torque upon said pulley to drive said pulley in one direction when the torque necessary to do so is less than the said predetermined value, to be stalled when the line is held stationary or to be overhauled when the line is so moved as to rotate the pulley oppositely to said direction.

12. In combination, a rotatably mounted pulley adapted to have operative frictional contact with a flexible line to pay out said line or to be rotated by said line when the line is wound in, and a torque motor operatively connected to said pulley.

13. In combination, a rotatably mounted pulley, means to press a flexible line into firm frictional contact therewith, and driving means operatively connected to said pulley to exert continuously a predetermined torque upon said pulley in the same direction to pay out said line when said line is free to be paid out and to be stalled by said pulley or to be overhauled thereby when said line is held stationary or wound in, respectively.

14. In combination, a rotatably mounted pulley, means to press a flexible line into firm frictional contact therewith, a prime mover, and connecting means between said pulley and prime mover, said means being effective to transmit torque to said pulley up to a predetermined magnitude and above said magnitude to permit said prime mover to continue in operation independently of said pulley.

J. C. PATTERSON.